US010430129B2

(12) United States Patent
Hirota et al.

(10) Patent No.: US 10,430,129 B2
(45) Date of Patent: Oct. 1, 2019

(54) INFORMATION PROCESSING APPARATUS, IMAGE FORMING APPARATUS, INFORMATION PROCESSING SYSTEM, AND INFORMATION PROCESSING METHOD CAPABLE OF CALLING FUNCTIONS OF PLURAL SERVERS (71) Applicant: KYOCERA Document Solutions Inc., Osaka (JP)

(72) Inventors: Masato Hirota, Osaka (JP); Takashi Oguma, Osaka (JP); Toru Yasui, Osaka (JP); Toshitsugu Nishimi, Osaka (JP); Chikara Yuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/146,992

(22) Filed: Sep. 28, 2018

(65) Prior Publication Data
US 2019/0129661 A1 May 2, 2019

(30) Foreign Application Priority Data
Oct. 26, 2017 (JP) .................. 2017-207289

(51) Int. Cl.
*G06F 3/12* (2006.01)
*H04L 29/06* (2006.01)
*G06F 21/60* (2013.01)

(52) U.S. Cl.
CPC .......... *G06F 3/1222* (2013.01); *G06F 3/1204* (2013.01); *G06F 3/1238* (2013.01); *G06F 3/1285* (2013.01); *G06F 21/608* (2013.01); *H04L 63/08* (2013.01)

(58) Field of Classification Search
CPC .... G06F 3/1222; G06F 3/1285; G06F 3/1204; G06F 3/1238; H04L 63/08
See application file for complete search history.

(56) References Cited

U.S. PATENT DOCUMENTS

2010/0095214 A1 4/2010 Ferlitsch
2017/0308337 A1* 10/2017 Yanagi .................. G06F 3/1236

FOREIGN PATENT DOCUMENTS

JP 2016-099806 A 5/2016

* cited by examiner

*Primary Examiner* — Kent Yip
(74) *Attorney, Agent, or Firm* — Hawaii Patent Services; Nathaniel K. Fedde; Kenton N. Fedde (57) ABSTRACT Provided is an information processing apparatus capable of calling functions of a plurality of servers without having to perform authentication every time. An authentication-executing unit, in the case where a function requires authentication in one of the plurality of servers, performs authentication with that server. An integrated-arrangement unit arranges in one application instruction areas that acquire instructions for calling the functions to any one of the plurality of the servers, and further, arranges the instruction areas in which a plurality of the functions that are similar and that require authentication by the authentication-executing unit and/or a plurality of the functions that are to be authenticated in the same server are organized as a folder. An authentication-state-changing unit controls the authentication state in correlation with any one of the folder organized by the integrated-arrangement unit, the application, and the function.

7 Claims, 6 Drawing Sheets

INFORMATION PROCESSING APPARATUS, IMAGE FORMING APPARATUS, INFORMATION PROCESSING SYSTEM, AND INFORMATION PROCESSING METHOD CAPABLE OF CALLING FUNCTIONS OF PLURAL SERVERS

INCORPORATION BY REFERENCE

This application is based on and claims the benefit of priority from Japanese Patent Application No. 2017-207289 filed on Oct. 26, 2017, the contents of which are hereby incorporated by reference.

BACKGROUND

The present disclosure relates to an information processing apparatus, an image forming apparatus, an information processing system and an information processing method, and more particularly, to an information processing apparatus, an image forming apparatus, an information processing system and an information processing method capable of calling the functions of plural servers.

Conventionally, there have been information processing apparatuses including image forming apparatuses such as multifunctional peripherals (MFP) or the like capable of printing text and images.

In addition, in typical technology, there are computing apparatuses that can collectively set parameters without being conscious of the types of apparatuses being set, even in the case where the types of the respective apparatuses for which parameters are being set differ. This kind of computing apparatus integrates two or more user interfaces from among a plurality of user interfaces. This is for two or more of a plurality of peripheral computing apparatuses having user interfaces that require user input. Moreover, the computing apparatus copies at least one user input of a plurality of user interfaces based on the integrated user interfaces. Then, the computing apparatus is configured so as to execute one or more instructions so that, based on the integrated user interfaces, the copied user settings are sent to two or more of the plurality of peripheral computing apparatuses.

In other words, in this typical technology, user input is simply copied and transmitted to a plurality of apparatuses.

SUMMARY

The information processing apparatus according to the present disclosure is an information processing apparatus capable of calling functions of a plurality of servers. The information processing apparatus includes an authentication-executing unit, an integrated-arrangement unit, and an authentication-state-changing unit. The authentication-executing unit, in the case where a function requires authentication in one of the plurality of servers, performs authentication with that server. The integrated-arrangement unit arranges in one application instruction areas that that acquire instruction for calling the functions to any one of the plurality of the servers, and further, arranges the instruction areas in which a plurality of the functions that are similar and that require authentication by the authentication-executing unit and/or a plurality of the functions that are to be authenticated in the same server are organized as a folder. The authentication-state-changing unit controls the authentication state in correlation with any one of the folders organized by the integrated-arrangement unit, the applications, and the functions.

The information processing system according to the present disclosure is an information processing system that includes a plurality of servers, and an information processing apparatus capable of calling functions of the plurality of servers. Each of the plurality of servers includes a function-information-transmitting unit, an authenticating unit, and a function-process-executing unit. The function-information-transmitting unit transmits function information regarding functions that require authentication to the information processing apparatus. The authenticating unit performs authentication of the function corresponding to the function information transmitted by the function-information transmitting unit. The function-process-executing unit executes a process of the function authenticated by the authenticating unit. The information processing apparatus includes a function-information-receiving unit, an authentication-executing unit, an integrated-arrangement unit, and an authentication-state-changing unit. The function-information-receiving unit receives the function information transmitted from the plurality of servers. The authentication-executing unit, in the case where a function requires authentication in one of the plurality of servers, performs authentication with that server. The integrated-arrangement unit arranges in one application instruction areas that acquire instruction for calling the functions to any one of the plurality of the servers, and further, arranges the instruction areas in which a plurality of the functions that are similar and that require authentication by the authentication-executing unit and/or a plurality of the functions that are to be authenticated in the same server are organized as a folder. The authentication-state-changing unit controls the authentication state in correlation with any one of the folders organized by the integrated-arrangement unit, the applications, and the functions.

The information processing method according to the present disclosure is an information processing method that is executed by an information processing apparatus capable of calling functions of a plurality of servers. The information processing method causes the information processing apparatus to, in the case where a function requires authentication in one of the plurality of servers, perform authentication with that server. The information processing method causes the information processing apparatus to arrange in one application instruction areas that acquire instructions for calling the functions to any one of the plurality of the servers, and further, arrange the instruction areas in which a plurality of the functions that are similar and that require authentication and/or a plurality of the functions that are to be authenticated in the same server are organized as a folder. The information processing method causes the information processing apparatus to control the authentication state in correlation with any one of the organized folders, the applications, and the functions.

DETAILED DESCRIPTION

<Embodiment>
[System Configuration of Information Processing System X]

First, the system configuration of information processing system X will be explained with reference to FIG. 1.

In the information processing system X according to this embodiment disclosed in the present disclosure, an image forming apparatus 1 and a plurality of servers 2a, 2b, 2c, . . . are connected by a network 5.

Incidentally, in the following, when referring to any one of the servers 2a, 2b, 2c, . . . the server will simply be referred to as "server 2".

The image forming apparatus 1 is an information processing apparatus such as a MFP, a network scanner, a document scanner, a network FAX, a printer with a scanner function, and the like. The image forming apparatus 1 is capable of installing and executing application software (application, hereinafter, simply referred to as an "application").

In addition, in this embodiment, the image forming apparatus 1 is capable of calling the functions of a plurality of servers via this application. As a result, the image forming apparatus 1 is able to use various functions from the application. Moreover, the image forming apparatus 1 may be capable of instructing the execution of a "workflow" that sequentially executes various processes by combining these various functions. As this workflow, for example, it may be possible to perform image processing, optical character recognition (OCR) processing, classification processing and the like. Furthermore, as the workflow, after OCR processing, classification processing or the like, it may also be possible to perform a transmitting process for transmitting to electronic mail (e-mail), a shared directory (document box), a document management system (DMS) for a business or office work, and the like.

The server 2 is an information processing apparatus capable of transmitting and receiving various data with the image forming apparatus 1, and capable of using various functions according to instructions from the image forming apparatus 1. More specifically, the server 2 may be a general-purpose machine, personal computer (PC) server, network attached storage (NAS), or the like. In addition, the server 2 may perform user authentication (hereinafter, simply referred to as "authentication") including a login process with the image forming apparatus 1.

Figure 1:
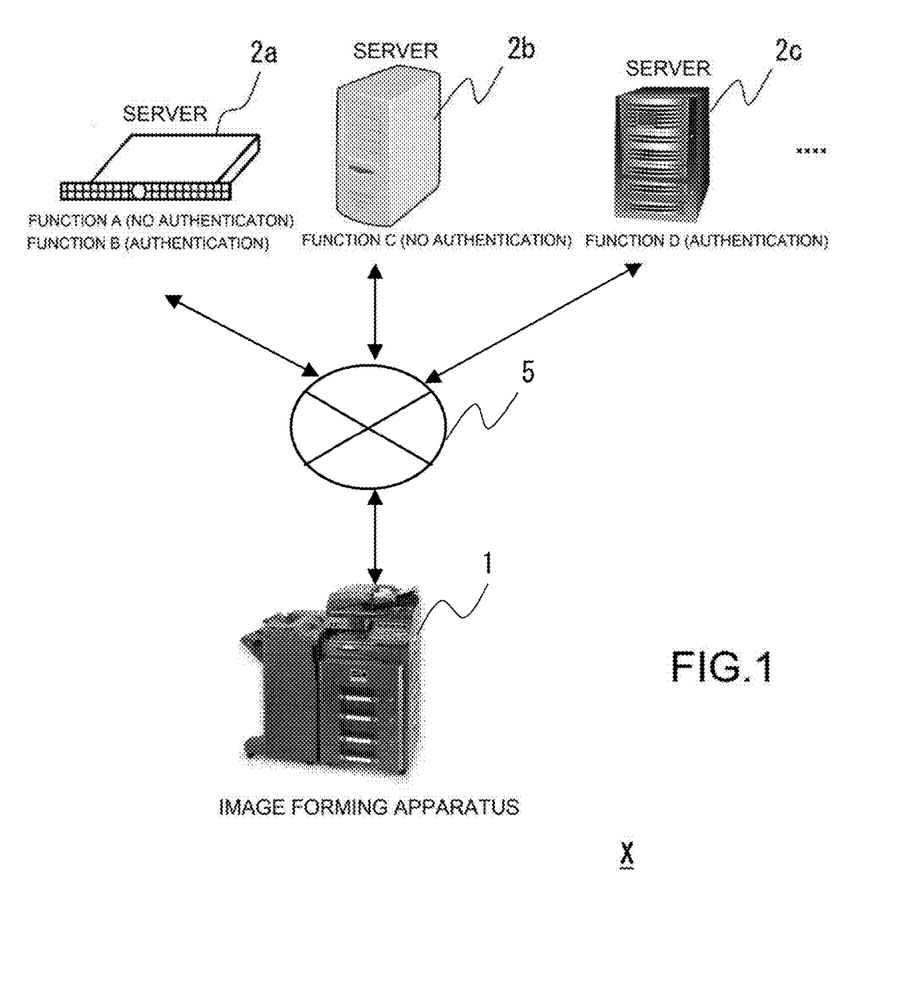
FIG. 1 is a system configuration diagram of an information processing system of an embodiment according to the present disclosure.

In the example in FIG. 1, of the servers 2, for example, server 2a is able to execute the processing of function A and function B. Server 2b is able to execute the processing of function C. Server 2c is able to execute the processing of function D. In other words, one server 2 may be capable of executing a process of a plurality of functions.

Moreover, the server 2 may require authentication for each function. In this case, the server 2 may execute processing related to a function corresponding to an instruction from the image forming apparatus 1 only in the case where an authenticated state is reached for a function that requires authentication. Furthermore, in the case of a function that does not require authentication, the server 2 may execute processing related to that function according to an instruction from the image forming apparatus 1 without performing authentication. In the example in FIG. 1, for example, function B and function D require authentication, and function A and function C do not require authentication.

Incidentally, configuration may be such that authentication is performed in units of each server 2. In addition, information processing system X may include even a larger number of servers 2, or may include a server 2 on a so-called "cloud", or the like.

Moreover, in this embodiment, the functions in each server 2 that require authentication do not need to support single sign-on (SSO) using a unified authentication account name and password. In other words, authentication information may differ for each server 2 unit. In addition, authentication may require different authentication information for each function.

In this embodiment, network 5 is an intranet such as a local area network (LAN), or a wide area network (WAN) such as the Internet, mobile telephone network, or the like. In the case where the network 5 is a WAN, the network 5 may be capable of connecting to another server 2 on a so-called "cloud" via a router, gateway, or the like. In addition, the network 5 may constitute a virtual private network (VPN).

[Control Configuration of the Image Forming Apparatus 1]

Figure 2:
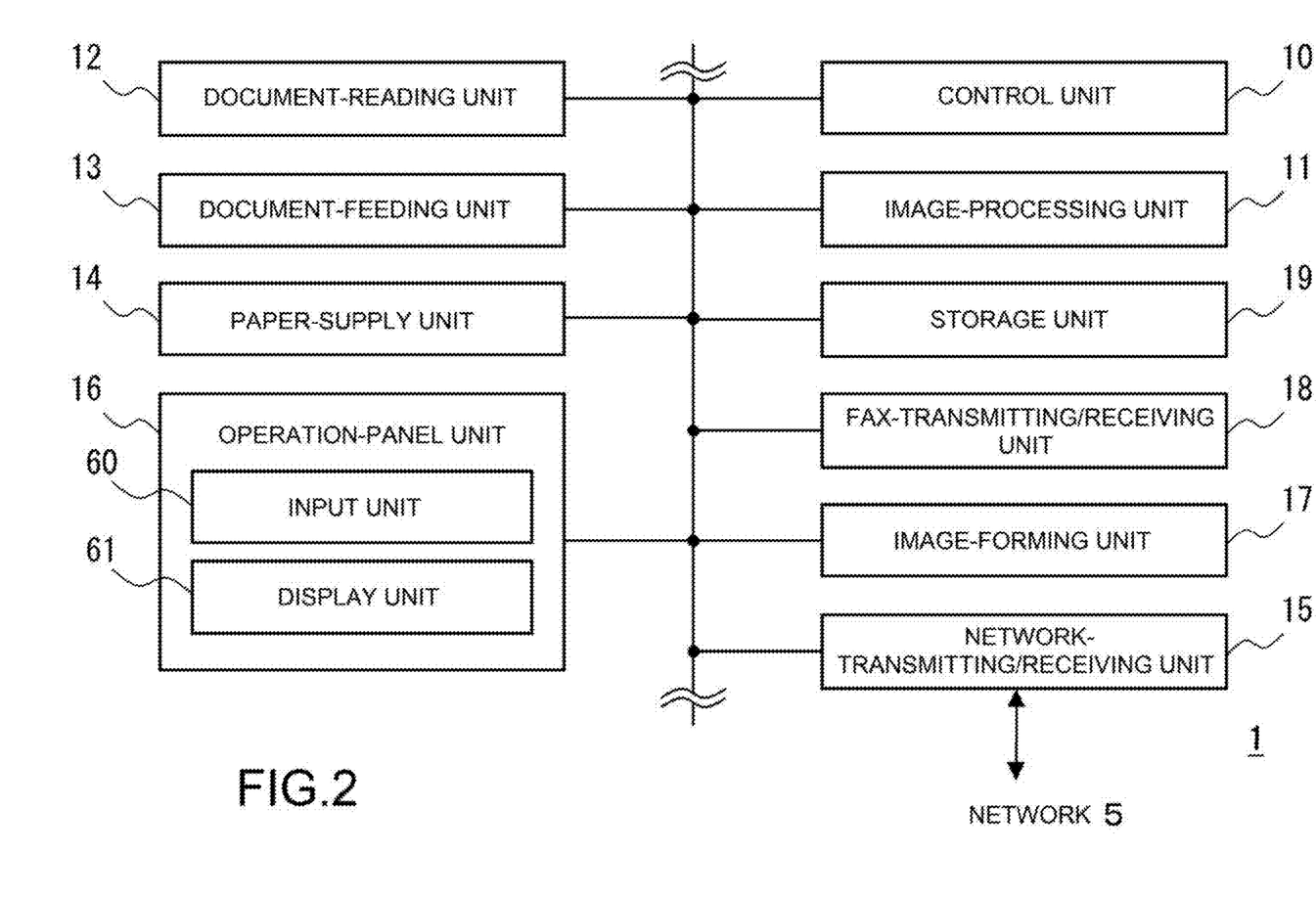
FIG. 2 is a block diagram illustrating control configuration of an image forming apparatus illustrated in FIG. 1.

Next, the control configuration of the image forming apparatus 1 of this embodiment will be explained with reference to FIG. 2.

The image forming apparatus 1 includes an image-processing unit 11, a document-reading unit 12, a document-feeding unit 13, a paper-supply unit 14, a network-transmitting/receiving unit 15, an operation-panel unit 16, an image-forming unit 17, a FAX-transmitting/receiving unit 18, a storage unit 19 and the like. Each unit is connected to a control unit 10, and operation is controlled by the control unit 10.

The control unit 10 is an information-processing unit such as a general purpose processor (GPP), a central processing unit (CPU), a micro processing unit (MPU), a digital signal processor (DSP), a graphics processing unit (GPU), an application specific processor (ASIC), or the like.

The control unit 10 can cause the operation as each unit of a functional block described later by reading a control program stored in the ROM or HDD of the storage unit 19, developing the control program in the RAM, and executing the control program.

Moreover, the control unit 10 performs overall control of the apparatus according to specific instruction information inputted from an external terminal or the operation-panel unit 16.

The image-processing unit 11 is a control-arithmetic unit such as a digital signal processor (DSP), a graphics processing unit (GPU) and the like. The image-processing unit 11 performs specific image processing of image data. This specific image processing, for example, may be processing such as enlargement/reduction, density adjustment, gradation adjustment, image improvement, and the like.

In addition, the image-processing unit 11 stores an image read by the document-reading unit 12 in the storage unit 19 as printing data. At this time, the image-processing unit 11 is also capable of converting the printing data into a file of an electronic document such as PDF of the like, or image data such as TIFF and the like. Moreover, the image-processing unit 11 may be capable of executing at least part of an OCR process.

The document-reading unit 12 is a unit for reading (scanning) a set document. In addition, the document-reading unit 12 is arranged in the upper portion of the main body of the image forming apparatus 1.

The document-reading unit 12, for example, includes a scanner, a platen glass, and a document-reading slit. In the case of reading a document that is placed on the platen glass, the document-reading unit 12 moves the scanner to a position facing the platen glass. Then, the document-reading unit 12 acquires image data by reading while scanning the document placed on the platen glass. The document-reading unit 12 outputs the acquired image data to the control unit 10.

Moreover, in the case of reading a document that is fed from the document-feeding unit 13, the document-reading unit 12 moves the scanner to a position facing the document-reading slit. Then, the document-reading unit 12 acquires image data by reading the document via the document-reading slit in synchronization with the conveying operation of the document by the document-feeding unit 13. The document-reading unit 12 outputs the acquired image data to the control unit 10.

The document-feeding unit 13 is a unit that feeds a document to be read by the document-reading unit 12. The document-feeding unit 13 is arranged in the upper portion of the document-reading unit 12.

The document-feeding unit 13 includes a document-placement unit and a document-conveying mechanism. The document-feeding unit 13 sequentially feeds a document that is placed in the document-placement unit to the document-reading unit 12 one sheet at a time by the document-conveying mechanism.

The paper-supply unit 14 is a unit that feeds recording paper toward the image-forming unit 17 one sheet at a time. The paper-supply unit 14 is included in the main body.

The network-transmitting/receiving unit 15 is a network connecting unit that includes an LAN board, a wireless transceiver and the like for connecting to the network 5.

The network-transmitting/receiving unit 15 transmits and receives data by a data-communication line, and transmits and receives voice signals by a voice telephone line.

The operation-panel unit 16 is a unit that acquires instructions from a user, and displays the state and the like of the image forming apparatus 1.

The configuration of the operation-panel unit 16 will be described later.

The image-forming unit 17 is a unit that, according to an output instruction from a user, performs image formation on recording paper from data that is stored in the storage unit 19, read by the document-reading unit 12, or acquired from an external terminal.

The image-forming unit 17 includes a photosensitive drum, an exposing unit, a developing unit, a transferring unit, a fixing unit and the like. The image-forming unit 17 records a toner image on recording paper by executing an image-forming process that includes charging, exposing, developing, transferring and fixing.

The FAX-transmitting/receiving unit 18 is a unit that performs transmission and reception of facsimiles. The FAX-transmitting/receiving unit 18 is able to receive a facsimile from another FAX apparatus via a voice line or the like, store the facsimile in the storage unit 19, and cause the image-forming unit 17 to form an image. In addition, the FAX-transmitting/receiving unit 18 is able to convert a document read by the document-reading unit 12 or data of a network FAX that is transmitted from an external terminal to image data, and transmit a facsimile to another FAX apparatus via a voice line or the like.

The storage unit 19 is a storage unit that uses a recording medium like a semiconductor memory such as a read only memory (ROM), a random access memory (RAM), a flash memory and the like, or a hard disk drive (HDD) and the like.

The RAM of the storage unit 19 may store storage contents even in a power-saving state by a function such as self refresh or the like.

A control program for performing operation control of the image forming apparatus 1 is stored in the ROM, flash memory or HDD of the storage unit 19. This control program includes programs such as an operating system (OS), various applications and the like, and data. The OS, various applications and the like include a function of enabling a user to operate the user's own apparatus via a graphical user interface (GUI) from the operation-panel unit 16 or another terminal.

In addition, this control program includes a World Wide Web (WWW) server, middleware, and the like that operate on the OS.

In addition to this, the storage unit 19 may store user account settings. Moreover, the storage unit 19 may include an area for a document box for each user.

Furthermore, the operation-panel unit 16 includes an input unit 60 and a display unit 61.

The input unit 60 includes a touch panel, switches, buttons and the like for acquiring various instructions from a user. The touch panel of the input unit 60, by a resistance film method, electrostatic capacitive method, distortion detection method or the like, detects coordinates and the like on the display unit 61 where a user presses. In addition, the input unit 60 may also be multi-touch compatible.

Moreover, the switches of the input unit 60, for example, are switches such as a start key, numeric key pad, operation mode switch, switches for acquiring instructions for a selected document, and the like. The operation mode may be capable of being switched between modes such as a copy mode, scanner mode and the like. An instruction for a selected document may be an instruction related to printing, transmission, reception and the like.

In addition, the input unit 60 may be capable of acquiring user instructions for respective instruction areas of an application to be described later.

The display unit 61 is a flat display panel such as a liquid-crystal display (LCD), organic electro-luminescence (OEL), field emission display (FED), fluorescent display tube, or the like, a projector, a status display LED, or the like.

The display unit 61 is able to display various operation screens of the GUI. The operation screens include an application screen, a display area displayed in an application for calling functions of the server 2, various buttons, and the like.

[Control Configuration of the Server 2]

Figure 3:
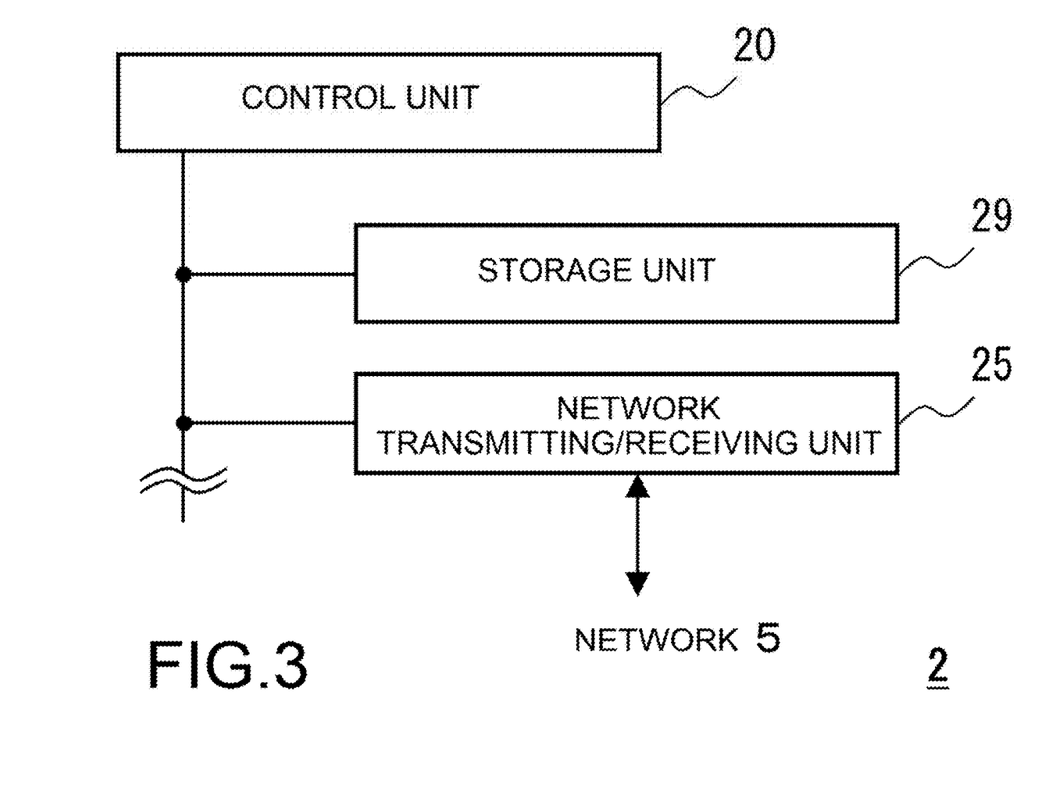
FIG. 3 is a block diagram illustrating control configuration of a server illustrated in FIG. 1.

Next, the control configuration of the server 2 will be explained using FIG. 3.

The server 2 includes a control unit 20, a network-transmitting/receiving unit 25, and a storage unit 29.

The control unit 20 is an information processing unit such as a GPP, CPU, MPU, DSP, GPU, ASIC or the like.

The control unit 20 is operated as each unit of a functional block described later by reading a control program that is stored in the ROM, SSD, or HDD of the storage unit 29, developing the control program in the RAM and executing the program.

The network-transmitting/receiving unit 25 is a network connecting unit that includes a LAN board, a wireless transceiver, and the like for connecting to the network 5.

The storage unit 29 is a storage unit that uses a a semiconductor memory such as a ROM, a RAM, a flash memory, or the like, or a recording medium such as an HDD, or the like.

The ROM, flash memory, or HDD of the storage unit 29 stores a control program for performing operation control of the server 2. This control program includes programs and data such as an OS, a service for executing processing of various functions, a daemon (Daemon), various applications, and the like. Moreover, this control program may also include a WWW (World Wide Web) server, middleware and the like that operate on the OS.

In addition to this, the storage unit 29 may also store account settings related to user authentication. Furthermore, the storage unit 29 may include a document box area for each user.

Incidentally, in the image forming apparatus 1, the control unit 10 and the image-processing unit 11 may be integrally formed such as a GPU-equipped CPU, or the like, or a chip-on-module package.

Moreover, in the server 2, the control unit 20 may also be integrally formed such as a GPU-equipped CPU, or the like, or a chip-on-module package.

In addition, the control unit 10 and the control unit 20 may incorporate a RAM, a ROM, a flash memory, or the like.

[Functional Configuration of the Information Processing System X]

Figure 4:
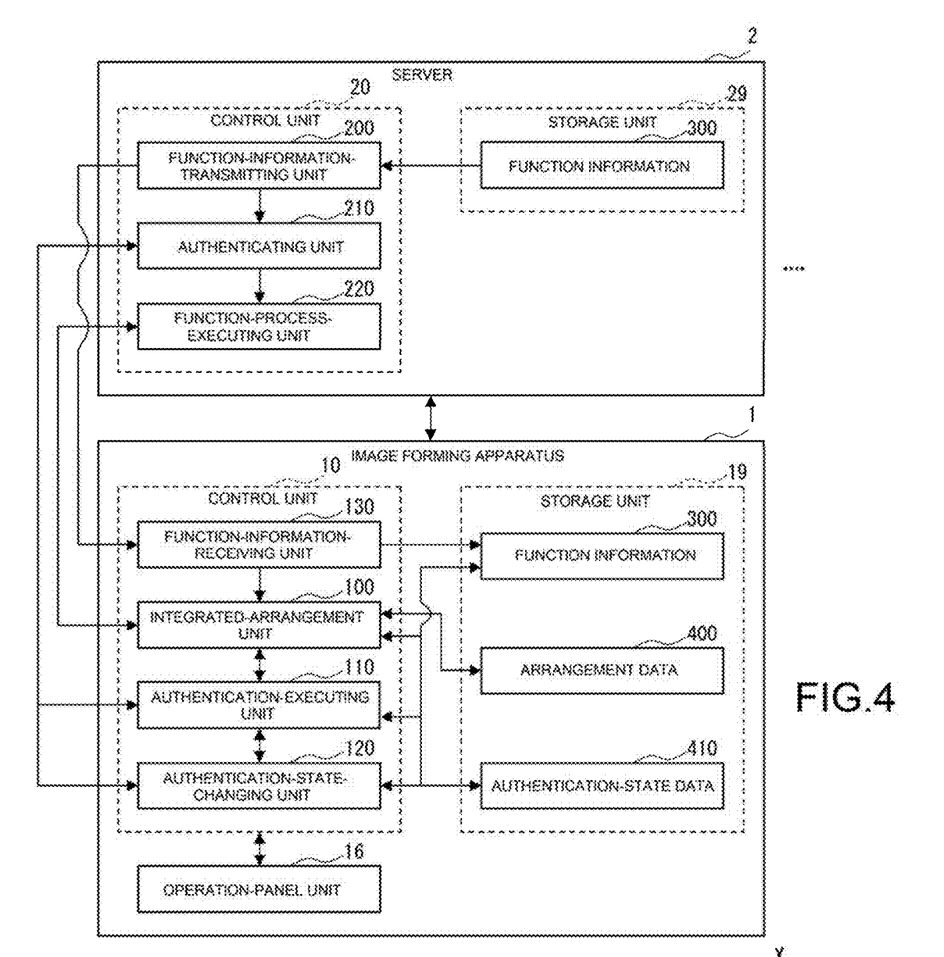
FIG. 4 is a block diagram illustrating the functional configuration of the information processing system illustrated in FIG. 1.

Here, the functional configuration of the information processing system X according to an embodiment disclosed in the present disclosure will be explained with reference to FIG. 4.

The control unit 10 includes an integrated-arrangement unit 100, an authentication-executing unit 110, an authentication-state-changing unit 120, and a function-information-receiving unit 130.

The storage unit 19 stores function information 300, arrangement data 400 and authentication-state data 410.

The control unit 20 includes a function-information-transmitting unit 200, an authentication unit 210, and a function-process-executing unit 220.

The storage unit 29 stores the function information 300.

The integrated-arrangement unit 100 arranges instruction areas that acquire instructions for calling functions to any one of the plurality of servers 2 in one application. At this time, the server 2 corresponding to a called function may differ for each instruction area.

Moreover, the integrated-arrangement unit 100 may arrange instruction areas. The instruction area is a folder that organizes a plurality of similar functions requiring authentication by the authentication-executing unit 110 and/or a plurality of functions to be authenticated in the same server 2.

Furthermore, the integrated-arrangement unit 100 does not need to organize an instruction area of functions that do not require authentication by the authentication-executing unit 110 as a folder.

In this embodiment, the integrated-arrangement unit 100, for example, causes a GUI screen of an application installed in the image forming apparatus 1 to be displayed on the display unit 61 of the operation-panel unit 16. In addition, the integrated-arrangement unit 100, for example, arranges instruction areas that instruct selection of a plurality of functions or folder in correspondence to arrangement data 400, and arranges the instruction areas on the screen of one application.

When doing this, the integrated-arrangement unit 100 may respectively arrange instruction areas for functions or folder that require authentication by the authentication-executing unit 110 and instruction areas for functions that do not require authentication on the screen of one application. Moreover, the integrated-arrangement unit 100 may arrange instruction areas, for which the servers 2 corresponding to the functions to be called differ, on the screen of one application.

Incidentally, the integrated-arrangement unit 100 may arrange and display instruction areas in the form of tiles, in the form of a list, or the like.

Furthermore, the integrated-arrangement unit 100 may arrange other menus, buttons and the like for acquiring user instructions for an application, and for displaying various kinds of information on the screen of one application.

In addition, the integrated-arrangement unit 100 may acquire from the input unit 60 an instruction in an instruction area for calling a function, and actually call the function of the corresponding server 2. When doing this, the integrated-arrangement unit 100 may call functions of different servers 2 for each instruction area.

In the case where authentication in a function is required in any one of the plurality of servers 2, the authentication-executing unit 110 performs authentication with that server 2. More specifically, in the case where authentication in a function of a server 2 corresponding to an instruction area arranged by the integrated-arrangement unit 100 is required, the authentication-executing unit 110 performs authentication with that server 2. Moreover, in the case where there is an instruction to select a folder in which functions of the server 2 are organized, the authentication-executing unit 110 may perform authentication in common for the functions organized in the folder.

In this embodiment, in the case, for example, where a user gives an instruction for an instruction area on the input unit 60 by pressing or the like, the authentication-executing unit 110 connects to the server 2 that executes processing of the function corresponding to the instruction area. When doing this, in the case where authentication is requested by the server 2, the authentication-executing unit 110 acquires authentication information inputted by the user from the input unit 60 or the like, and transmits this information to the server 2 to perform authentication. The authentication-executing unit 110 may set the authentication result and authentication information in authentication-state data 410.

The authentication-state-changing unit 120 controls the authentication state authenticated by the authentication-executing unit 110 in correlation with any one of a folder, application and function.

More specifically, the authentication-state-changing unit 120 may keep the authentication state corresponding to any one of a folder and function so that even after calling a function different from that function, authentication will not be required again.

In other words, the authentication-state-changing unit 120 may keep the authentication state corresponding to any one of a folder and a function. Of these, in the case where a function in an instruction area of a folder is called, the authentication-state-changing unit 120 does not need to perform authentication again even after calling a different function inside the same folder.

In addition, in this embodiment, the authentication-state-changing unit 120, by the authentication-executing unit 110, for example, maintains a connection session or the like for a server 2 corresponding to a folder, and/or for a server 2 corresponding to a function in an instruction area that is already authenticated. As a result, in the case where the user calls the same function, the process of that function is executed in the authenticated state. In this way, the authentication-state-changing unit 120 may control the authentication state authenticated by the authentication-executing unit 110 in correlation with a folder or a function.

In addition, in this embodiment, the authentication-state-changing unit 120, for example, when terminating execution of an application, disconnects the sessions or the like with the plurality of servers 2 having functions that can be called from the application, and returns to an unauthenticated state. In this way, the authentication-state-changing unit 120 may control the authentication state authenticated by the authentication-executing unit 110 in correlation with an application.

The function-information-receiving unit 130 receives function information 300 transmitted from a plurality of servers 2 and stores that function information 300 in the storage unit 19.

The function-information-transmitting unit 200 acquires function information 300 of a function that requires authentication from the storage unit 29, and transmits that function information 300 to the image forming apparatus 1. Incidentally, for a function to be provided by the server 2, the function-information-transmitting unit 200 does not need to transmit function information 300 when authentication is not required.

The authenticating unit 210 performs authentication of the function corresponding to the function information 300 transmitted by the function-information-transmitting unit 200. At this time, the authenticating unit 210 acquires authentication information from the image forming apparatus 1, and performs authentication by comparing this authentication information with the account settings. In addition, the authenticating unit 210 may perform authentication for functions in the same server 2 or functions organized in an above-described folder using the same account settings. Moreover, the authenticating unit 210 may perform authentication by acquiring an ID (identification) or account name, a password or the like as authentication information. In addition to this, the authenticating unit 210 may perform authentication by acquiring authentication information such as authentication information of an ID card such as an IC card, a magnetic card, or the like, authentication information such as a PIN or the like that is a several-digit numerical value that is inputted, authentication information for biometric authentication such as fingerprint authentication, vein authentication, iris authentication, face authentication and the like, or authentication information of a combination of these various kinds of authentication, and the like.

The function-process-executing unit 220 executes the process of the function authenticated by the authentication unit 210. This function-process-executing unit 220 may execute processing for each function provided by the server 2, or may execute processing as a process, thread or the like for data based on a session or the like.

The function information 300 is information that indicates contents of a function that is provided by the server 2. In addition, the function information 300 may include information indicating a function that requires authentication. For example, the function information 300 may include settings such as the type of function, the format that can be used for input data and output data, setting data for the calling format or pipe of a function for a workflow, setting whether or not authentication is necessary, or the like.

The arrangement data 400 is GUI data of an application installed in the image forming apparatus 1. The arrangement data 400 includes information regarding the instruction areas in the application corresponding to each of the functions of the plurality of servers 2.

More specifically, the arrangement data 400, for example, may be configured by a markup language such as XML, HTML or the like, a macro language, or the like. In addition, the arrangement data 400, for example, may include information regarding each area of the GUI that identifies each of the functions. Moreover, the arrangement data 400, as the type of each area, may include instruction areas corresponding to the functions of the server 2, areas of the GUI components such as buttons, menus and the like. Moreover, the arrangement data 400, as information regarding each of the areas, may include information about appearance such as arrangement positions, size, colors, fonts, and the like, the types of user instructions to acquired by the application and the like. Of these, arrangement data 400, as information regarding arrangement positions of the instruction areas, for example, may include ratios of dividing positions, relative positions, and rectangular coordinates of pixel positions in the application. In addition, the arrangement data 400, as information regarding the instruction areas, may include information about the server 2 to be called and types of functions, the addresses and protocols of the server 2 and functions to be called, data to be transmitted and received, settings and the like. Moreover, the arrangement data 400, as information regarding the instruction areas, may include data and the like described in a macro language or script language indicating the workflow procedure or the like.

In addition, the arrangement data 400, for example, may include, descriptions of buttons or the like that can be displayed on the application screen 500 (application screen) and that instruct specific processes. The buttons may include buttons such as an end (close) button of the application, a workflow add or change button, and other buttons and the like for setting special printing methods, setting the arrangement of the functions themselves, instruct the moving of folder hierarchy, and the like.

Moreover, the arrangement data 400 may include information regarding a folder.

More specifically, the arrangement data 400 may include, for example, information regarding the presence or absence of a folder in which functions are organized, and the information in this folder for each instruction area. As the information in this folder, for functions of the same server 2 and/or similar functions, the information may include the type of functions organized in the folder, and various information regarding the folder of the calling source, and information regarding the above-described instruction area. Moreover, this folder may be hierarchically organized inside the arrangement data 400. In other words, an even lower folder may be called from the instruction area of a function inside the folder.

Furthermore, the arrangement data 400 may be set for the image forming apparatus 1 by using the operation panel unit 16, a terminal, or the like according to an instruction from an administrator of the information processing system X.

Incidentally, functions provided by the same server 2 may be authenticated with the same authentication information. Moreover, it may be possible to authenticate similar functions by the same authentication information even though the functions are not provided by the same server 2.

Incidentally, the arrangement data 400 may include buttons inside and outside the respective instruction areas for changing the authentication state of a session related to each function of the server 2, for example.

Authentication-state data 410 is data that indicates the authentication state performed by the authentication-executing unit 110 with the server 2. More specifically, the authentication-state data 410 includes information regarding the authentication state corresponding to each function of the server 2. In addition, the authentication-state data 410, as information regarding this authentication state, may, for example, include information of an "authenticated state" as a state in which authentication is successful and calling a function of the server 2 is possible, and an "unauthenticated state" as an unauthenticated state or authentication failed state. Moreover, the authentication-state data 410, in the case of an authenticated state, may include information regarding the state of a connection session with the function and the like. Information regarding the state of this session may include information such as authentication information related to authentication by a user, connection time from the start of a session connection, time until disconnection, and the like.

Furthermore, in this embodiment, as authentication-state data 410, common information for each function may be used, or different information for each function may be used. In addition, the authentication-state data 410 may also include information for individual authentication that is different for each server 2 or each function to be called. Moreover, the authentication-state data 410 may be encrypted.

Here, the control unit 10, by executing the control program stored in the storage unit 19, is made to function as the integrated-arrangement unit 100, the authentication-executing unit 110, and the authentication-state-changing unit 120.

Moreover, the control unit 20, by executing the control program stored in the storage unit 29, is made to function as the function-information-transmitting unit 200, the authenticating unit 210, and the function-process-executing unit 220.

In addition, each unit of the image forming apparatus 1 and server 2 described above is a hardware resource that executes the image forming method according to the present disclosure.

Incidentally, part or an arbitrary combination of the functional configurations described above may be configured as hardware such as an IC, programmable logic, or the like.

[Application Execution Process by the Image Forming Apparatus 1]

Figure 5:
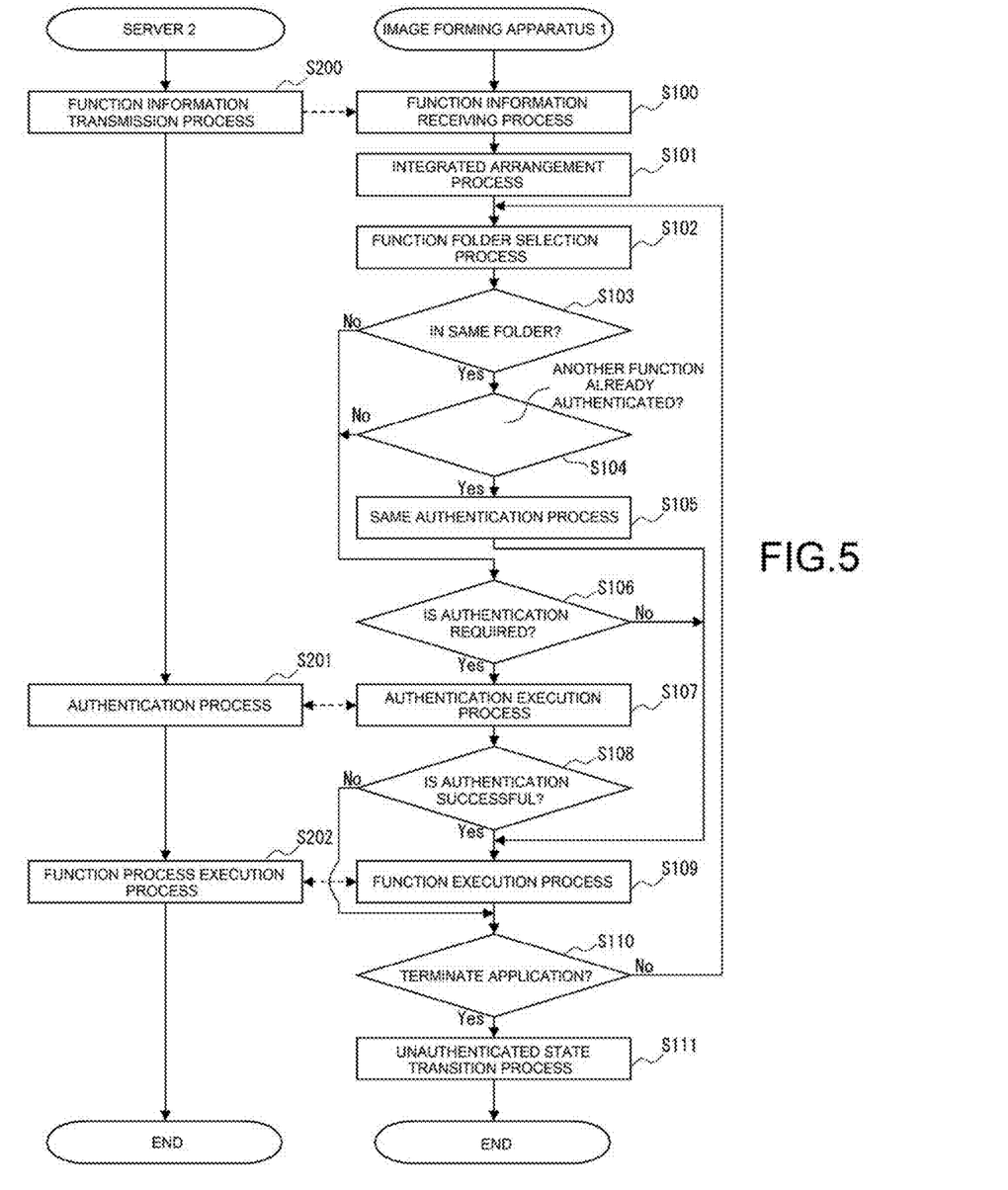
FIG. 5 is a flowchart of an application execution process of an embodiment according to the present disclosure.

Next, the application execution process by the image forming apparatus 1 of the information processing system X according to an embodiment disclosed in the present disclosure will be explained with reference to FIG. 5 and FIG. 6.

The application execution process of this embodiment, including information processing method executed by the image forming apparatus 1 that is capable of calling functions of a plurality of servers 2, is executed by the image forming apparatus 1 and the servers 2. In the application execution process, the image forming apparatus 1 arranges and displays instruction areas that acquire instructions for calling the functions to any one of the plurality of servers 2 on the screen of one application. In addition, in the case where execution of a function is instructed from an instruction area, a connection is made with the corresponding server 2, and in the case where authentication is required, authentication is performed with that server 2. Moreover, the authenticated authentication state is controlled in correlation with the application and/or function.

In the application execution process of this embodiment, mainly the control unit 10 of the image forming apparatus 1 executes the program stored in the storage unit 19, and the control unit 20 of the server 2 executes the program stored in the storage unit 29 by using the hardware resources in cooperation with each unit.

Hereinafter, each step of the application execution process will be explained in detail with reference to the flowchart in FIG. 5.

(Step S200)

First, the function-information-transmitting unit 200 of the server 2 performs a function-information-transmitting process.

The function-information-transmitting unit 200, according to an instruction by the administrator from the operation-panel unit 16 of the image forming apparatus 1, a terminal or the like, transmits function information 300 regarding a function that requires authentication to the image forming apparatus 1.

(Step S100)

Next, the function-information-receiving unit 130 of the image forming apparatus 1 performs a function-information-receiving process.

The function-information-receiving unit 130 receives the function information 300 transmitted from the server 2, and stores that function information 300 in the storage unit 19. At this time, the function-information-receiving unit 130 may receive function information 300 from a plurality of servers 2. In addition, the function-information-receiving unit 130 may apply and set this stored function information 300 in arrangement data 400 according to an instruction or the like from the administrator.

Next, the integrated-arrangement unit 100 performs an integrated arrangement process.

When one application is executed, the integrated-arrangement unit 100 displays the screen of that application on the display unit 61.

Here, the integrated-arrangement unit 100 references the arrangement data 400 and arranges and draws an instruction area for each function. When doing this, the integrated-arrangement unit 100 may align and arrange instruction areas that instruct processing of a plurality of functions. In addition, the integrated-arrangement unit 100, for each of the instruction areas, may respectively set functions that require authentication, and functions that do not require authentication, and the server 2 to be called may also be set differently.

Moreover, the integrated-arrangement unit 100 arranges a folder in which functions are organized as an instruction area.

Furthermore, the integrated-arrangement unit 100 may arrange buttons and the like for terminating an application on the screen of the same application.

Figure 6:
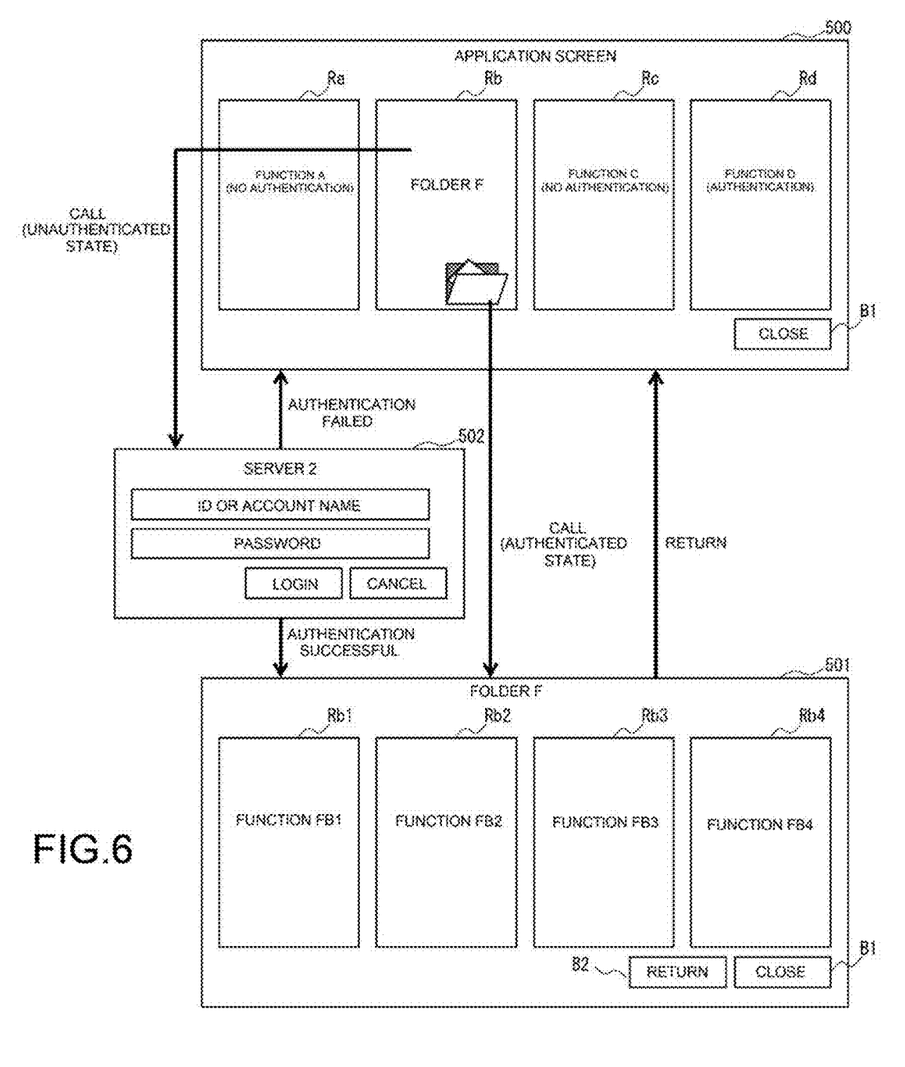
FIG. 6 is a concept diagram of a function call according to the application execution process illustrated in FIG. 5.

To explain this with reference to FIG. 6, an application screen 500 is an example of a screen that is a main screen (home screen) displayed by one application. In this example of an application screen 500, the integrated-arrangement unit 100 respectively arranges an instruction area Ra corresponding to a function A, an instruction area Rb of a folder F in which functions of the same server 2 are organized, an instruction area Rc corresponding to a function C, and an instruction area Rd corresponding to a function D. In addition, the integrated-arrangement unit 100, arranges a "Close" button B1 that disconnects a session connection by the authentication-state-changing unit 120 and terminates the application on the application screen 500.

(Step S102)

Here, the integrated-arrangement unit 100 performs selection of a function folder.

The integrated-arrangement unit 100 acquires instructions by a user selecting and pressing or the like an instruction area in the GUI using the input unit 60.

In addition, the integrated-arrangement unit 100 references the arrangement data 400 and determines whether an instruction of any one of the instruction areas of a function or folder is acquired.

Moreover, in the case where an instruction of a function instruction area is acquired, the integrated-arrangement unit 100 determines whether to perform calling of the selected function for any one of the servers 2.

Furthermore, in the case where an instruction for selecting a folder instruction area is acquired, the integrated-arrangement unit 100 draws and arranges that folder instruction area. In other words, the integrated-arrangement unit 100 arranges an instruction area in which a plurality of similar functions that require authentication by the authentication-executing unit 110 and/or a plurality of functions that are authenticated in the same server 2 are organized as a folder.

In the example in FIG. 6, in the case where the instruction area Rb of the folder F is pressed, the integrated-arrangement unit 100 draws the application screen 501 (application screen) of the folder F. In the example of the application screen 501, the integrated-arrangement unit 100 respectively draws and arranges instruction area Rb1 corresponding to the function FB1 of the same server 2, instruction area Rb2 corresponding to the function FB2, instruction area Rb3 corresponding to the function FB3, and the instruction area Rb4 corresponding to the function FB4. Moreover, in addition to the above-described button B1, the integrated-arrangement unit 100 may also arrange a "return" button B2 for closing the folder F and returning to the above-described application screen 500.

In the case where this "return" button B1 is pressed or the like and is instructed, the integrated-arrangement unit 100 redraws and displays the application screen 500 on the display unit 61 again.

Incidentally, in the case where folders are hierarchically set in the arrangement data 400, the integrated-arrangement unit 100 may be able to return to the upper hierarchy according to an instruction from the user. In addition, the integrated-arrangement unit 100 may display a hierarchy from a menu or the like instead of a button.

(Step S103)

Next, the authentication-executing unit 110 determines whether or not an instruction for a function inside the same folder is acquired. The authentication-executing unit 110 references the function information 300 and/or the arrangement data 400, and in the case where an instruction for calling a function is acquired for an instruction area inside the same folder, determines YES. In all other cases, or in other words, in cases where the instruction area of the folder itself is pressed, or in the case where an instruction area of a function that is not organized in the folder is pressed and a calling instruction is acquired, the authentication-executing unit 110 determines NO.

In the case of YES, the authentication-executing unit 110 advances the process to step S104.

In the case of NO, the authentication-executing unit 110 advances the process to step S106.

(Step S104)

In the case of an instruction of a function in the same folder, the authentication-state-changing unit 120 determines whether or not another function in the same folder has already been authenticated. In the case where the function to be called is not authenticated, however the other function in the same folder has already been authenticated, the authentication-state-changing unit 120 determines YES. In the example of FIG. 6, in the case where on the application screen 501 any one of the functions FB1 to FB4 in the folder F that are to be called is already authenticated, and an instruction to call another function FB1 to FB4 that is different from the authenticated function is acquired, the authentication-state-changing unit 120 determines YES. In all other cases, the authentication-state-changing unit 120 determines NO.

In the case of YES, the authentication-state-changing unit 120 advances the process to step S105.

In the case of NO, the authentication-state-changing unit 120 advances the process to step S106.

(Step S105)

In the case where another function inside the same folder has already been authenticated, the authentication-state-changing unit 120 performs the same authentication process.

The authentication-state-changing unit 120 performs authentication for a function for which there is a calling instruction by using the authentication information of the authentication-state data 410 for another function in the same folder that has already been called. Incidentally, at this time, the authentication-state-changing unit 120 may separately connect a session for this function. In addition, in the case where re-authentication in the same server 2 is not necessary, the authentication-state-changing unit 120 does not need to perform authentication. In this case as well, the authentication-state-changing unit 120 may connect a session with that server 2 with the same authentication information.

As a result, it becomes possible for the authentication-state-changing unit 120 to control the authentication state in correlation with a folder organized by the integrated-arrangement unit 100.

(Step S106)

In the case where there is no instruction for a function inside the same folder, the authentication-executing unit 110 determines whether or not authentication is required. The authentication-executing unit 110 references authentication-state data 410, and determines YES when calling a selected function in the case where authentication is required in an unauthenticated state where authentication with the corresponding server 2 is required.

In addition, the authentication-executing unit 110 also determines YES in the case where pressing or the like of an instruction area of a folder is instructed, and authentication has not yet been performed for a function in the same folder.

Moreover, in all other cases, or in other words, in the case where the corresponding function or folder is in the authenticated state, or in the case where authentication is not required for that function or folder, the authentication-executing unit 110 determines NO.

In the case of YES, the authentication-executing unit 110 advances the process to step S107.

In the case of NO, the authentication-executing unit 110 advances the process to step S109.

(Step S107)

In the case where authentication is required, the authentication-executing unit 110 performs an authentication execution process.

The authentication-executing unit 110 references the arrangement data 400, then connects to the address of the server 2 corresponding to the function or folder of the selected instruction area and performs authentication. Here, in the case where a folder is selected, the authentication-executing unit 110 performs authentication in common for functions organized in the folder.

More specifically, the authentication-executing unit 110, as this authentication, may, for example, perform a login process or the like. In this login process, the authentication-executing unit 110, as password authentication, may display an authentication screen on the display unit 61 and have the user input authentication information that includes a user ID or account name, a password, and the like from the input unit 60.

In the example of the application screen 502 in FIG. 6, the authenticating unit 210 displays a dialog box for performing authentication on the display unit 61. On this application screen 502 (authentication dialog box of the server 2), an input column for inputting an ID, an account name, a password, or the like for the server 2, a "login" button to be pressed after input, a "cancel" button for stopping authentication, and the like are arranged.

In addition, the authentication-executing unit 110 may perform authentication such as authentication using ID card authentication, PIN authentication, biometric authentication, a combination of these various authentications, or the like.

The authentication-executing unit 110 transmits the authentication information acquired by these authentications to the corresponding server 2.
(Step S201)

Here, the authenticating unit 210 of the connected server 2 performs an authentication process.

The authenticating unit 210 acquires authentication information of the image forming apparatus 1 and performs authentication.

The authentication unit 210 transmits the authentication result of whether or not this authentication was successful to the image forming apparatus 1.

The authentication-executing unit 110 of the image forming apparatus 1 sets this authentication result in the authentication-state data 410. When doing this, the authentication-executing unit 110 may also set the authentication information such as the user ID or account name, the password, the ID card data, the PIN number, the biometric authentication data, or the like inputted during the login process for each function in the authentication-state data 410. The authentication information included in this authentication-state data 410 may be stored only during execution of the application. This authentication information may be stored only while the application is installed. This authentication information may be stored even after installation.
(Step S108)

Next, the authentication-executing unit 110 determines whether or not authentication is successful. In the case where authentication is successful, the authentication-executing unit 110 determines YES. In all other cases, the authentication-executing unit 110 determines NO.

In the case of YES, the authentication-executing unit 110 advances the process to step S109.

In the case of NO, the authentication-executing unit 110 advances the process to step S110.

Here, the integrated-arrangement unit 100 and the authentication-state-changing unit 120 perform a function-execution process.

The integrated-arrangement unit 100 causes the server 2 or the like to execute the process for the selected function. In addition, the integrated-arrangement unit 100 may reference the arrangement data 400 and cause the corresponding server 2 to execute the process in accordance with the settings for the data, protocol or the like that is to be transmitted and received. Moreover, the integrated-arrangement unit 100 may cause the workflow to be executed in accordance with data that is described in the macro language or script language of the corresponding instruction area.

Furthermore, the integrated-arrangement unit 100 may transmit the data corresponding to that function to the server 2.

(Step S202)

Here, the function-process-executing unit 220 of the connected server 2 executes the process of the selected function. At this time, the function-process-executing unit 220 may execute the process of the function authenticated by the authenticating unit 210.

In addition, the function-process-executing unit 220 may receive data corresponding to that function from the image forming apparatus 1, execute the process corresponding to the function, and transmit the data after execution to the image forming apparatus 1.

Here, the integrated-arrangement unit 100 of the image forming apparatus 1 acquires the result of execution of the process of the function of the server 2. At this time, the integrated-arrangement unit 100 may acquire the data after execution.

Moreover, at this time, in the case where a session is disconnected due to elapsing of a specified amount of time or for some other reason, the authentication-state-changing unit 120 may perform authentication again using the authentication-state data 410.

With this kind of configuration, a session is maintained during execution of the application. Therefore, when using a function for which authentications has once been performed, it is not necessary to perform authentication again. In other words, the authentication-executing unit 110 is able to control the authentication state in correlation with a folder or a function.

In addition, in the case where authentication related to another function is simultaneously required in an authentication area displayed by the integrated-arrangement unit 100, the authentication-state-changing unit 120 may cause authentication to be performed according to stored authentication-state data 410. At that time, the authentication-state-changing unit 120 may transfer this authentication-state data 410 to the other function, and transmit the authentication-state data 410 to the server 2 corresponding to the other function.

Incidentally, configuration may be such that after a specified amount of time has elapsed, the state returns to the unauthenticated state without authentication being performed again automatically.
(Step S110)

Here, the authentication-state-changing unit 120 determines whether or not there is an instruction to terminate the application. In the case where there is an instruction from a user using the input unit 60 to terminate the application, the authentication-state-changing unit 120 determines YES. The authentication-state-changing unit 120, for example, determines YES in the case where an instruction is given by a "close" button B1 on the application screens 500, 501 in FIG. 5 being pressed, or where an instruction is given to terminate the application from the menu. In all other cases, the authentication-state-changing unit 120 determines NO.

In the case of YES, the authentication-state-changing unit 120 advances the process to step S111, In the case of NO, the authentication-state-changing unit 120 returns the process to step S102, and continues acquiring instructions by a user to select a function folder.
(Step S111)

In the case where there is an instruction to terminate the application, the authentication-state-changing unit 120 performs an unauthenticated-state-transition process.

The authentication-state-changing unit 120 disconnects the connections with all servers 2 in accordance to the termination of the application. More specifically, the authentication-state-changing unit 120, when terminating execution of the application, disconnects the session and the like with the plurality of servers 2 having functions that can be called from the application, returns to the unauthenticated state, and sets this in the authentication-state data 410. As a result, the authentication-state-changing unit 120, by the authentication-executing unit 110, is able to control the authentication state in correlation with the application.

Incidentally, in this embodiment, when executing a terminated application again, authentication is performed again. As a result, by performing authentication once during execution of an application, authentication is not necessary again, so it is possible to reduce the time and effort by the user while improving security.

Conversely, authentication may be performed according to authentication data, and the state can be automatically transitioned from the unauthenticated state to the authenticated state.

Moreover, in this embodiment, in the case where a function inside a folder is authenticated once, then a folder is selected again after a "Return" to the upper hierarchy, it is not necessary to perform re-authentication.

This ends the application execution process according to an embodiment disclosed in this disclosure.

With the configuration described above, the following effects can be obtained.

Conventionally, in a system such as in the typical technique described above, when trying to respectively call functions of a plurality of servers having different authentication information, it is necessary to perform authentication every time.

More specifically, in a conventional technique, it is necessary to respectively call functions of a plurality of servers from individual applications. Therefore, when each application is closed in order to use a different function, the connection (session) with the server ends, and the connection state becomes the same as in the logged off state. As a result, authentication must be performed again every time the application is switched, and the user must input authentication information again. In other words, in the case where the application is switched and authentication is necessary for the application to be used next, authentication must be performed every time. Therefore, it takes time and effort for the user to perform this.

On the other hand, the information processing system X according to an embodiment disclosed in this disclosure includes a plurality of servers 2, and an image forming apparatus 1 that is an information processing apparatus capable of calling functions of the plurality of servers 2. Each of the plurality of servers 2 includes a function-information-transmitting unit 200 that transmits function information 300 of a function requiring authentication, an authenticating unit 210 that performs authentication of a function corresponding to the function information 300 transmitted by the function-information-transmitting unit 200, and a function-process-executing unit 220 that executes a process of a function authenticated by the authenticating unit 210.

The image forming apparatus 1 includes: a function-information-receiving unit 130 that receives function information 300 transmitted from the plurality of servers 2; an authentication-executing unit 110 that, in the case where authentication is required for a function in any one of the plurality of servers 2, performs authentication with that server 2; an integrated-arrangement unit 100 that arranges in one application instruction areas that acquire instructions for calling the functions to any one of the plurality of servers 2, and further arranges instruction areas in which a plurality of similar functions that require authentication by the authentication-executing unit 110 and/or a plurality of function to be authenticated in the same server 2 are organized as a folder; and an authentication-state-changing unit 120 that controls the authentication state in correlation with any one of a folder organized by the integrated-arrangement unit 100, application, and function.

With this kind of configuration, by making it possible to use a plurality of different functions with one application, it is not necessary to perform authentication every time when respectively calling functions of a plurality of servers 2. In addition, in an instruction area organized as a folder, the authentication state is controlled in this folder. Therefore, it is possible to reduce the time and effort for performing authentication that occur when using a plurality of different functions, and to improve usability.

In other words, even in the case of selecting a function or folder that requires authentication, and executing the function, the image forming apparatus 1 of this embodiment, does not need to perform operations such as performing authentication again, activating and terminating the application for using each function, and the like. Therefore, it is possible to reduce the number of operation steps compared with the case in which functions are called from individual applications.

Moreover, in the image forming apparatus 1 according to an embodiment disclosed in the present disclosure, the integrated-arrangement unit 100 does not organize the instruction areas of the functions that do not require authentication by the authentication execution unit 110 as folders, and the server 2 corresponding to a function to be called may be different for each indicated area.

With this configuration, by not organizing the instruction areas of the functions that do not require authentication in a folder, it is easy to identify the functions that need to be authenticated in the same server 2, and it becomes possible to effectively use a plurality of different functions from one application.

In addition, functions that require authentication by the user, functions that do not require authentication by the user, and functions provided by different servers 2 can be used in a unified way. Therefore, it is possible to reduce the time and effort required by the user.

Moreover, in the image forming apparatus 1 according to an embodiment disclosed in the present disclosure, the authentication-state-changing unit 120 keeps the authentication state corresponding to a folder, and even after calling a different function inside the instruction area of the folder, authentication is not required again.

With this kind of configuration, it is possible to continue keeping an authentication state with a server 2 when calling functions within the same folder. Therefore, when used to switch to a different function inside the same folder, by logging in to the corresponding server 2 once, it becomes possible to use a specified function without inputting authentication information again.

Incidentally, even when a session ends for some reason, the user does not need to input authentication information every time. In addition, with this kind of configuration that stores authentication information even when an application is terminated, the user does not need to input authentication information even when terminating and activating an application again.

[Other Embodiments]

Note that in the embodiment described above, authentication states are kept in application units. However, authentication states may be kept for each function, and the authentication state of all functions may be set to the unauthenticated state during execution of an application. In other words, the authentication-state-changing unit 120, for example, may be configured so as to arrange buttons for changing the authentication state of each server in the instruction areas, and arrange a button for changing all of the authentication states of a plurality of servers outside the instruction areas.

Moreover, in the above-described embodiment, an example is described in which only functions requiring authentication are organized in a folder.

However, the integrated-arrangement unit 100 may also organize instruction areas of functions that do not require authentication as a folder. In that case, similar functions may be organized as a folder. The similar functions may be functions having a somewhat different format or the like of data inputted in the workflow, or may be functions such as "transmission", "reception" and the like that are of a similar type, or the like.

With this kind of configuration, it becomes easy to call similar functions regardless of authentication, and the operability of the user is improved.

Moreover, the technique according to the present disclosure can also be applied to an information-processing apparatus other than an image forming apparatus. In other words, a configuration is also possible that uses a server or the like that separately connects to a network scanner or scanner by a USB or the like.

However, in the typical technique described above, when trying to respectively call functions of a plurality of servers, it is necessary to perform authentication every time.

The present disclosure takes into consideration this kind of situation, and provides an information processing apparatus that eliminates the above-described problems.

With the technique according to the present disclosure, instruction areas for acquiring instructions that call a function to any one of a plurality of servers are arranged in one application, a plurality of similar functions that require authentication and/or a plurality of functions that are to be authenticated in the same server are organized as a folder, authentication corresponding to an instruction area is executed, and the authentication state is controlled in correlation with any one of a folder, application and/or function. As a result, an information processing apparatus is provided that does not need to perform authentication every time functions of servers are called.

Moreover, the configurations and operations of the above-described embodiments are examples, and needless to say can be appropriately changed and executed within a range that does not depart from the gist of the present disclosure.

What is claimed is:

1. An information processing apparatus capable of calling functions of a plurality of servers, comprising:
   a storage unit that stores function information that indicates a function requiring authentication provided by a server of the plurality of servers, arrangement data that includes information of instruction areas in an application corresponding to each of the functions of the plurality of servers, and authentication state data that indicates an authentication state;
   an integrated-arrangement unit that arranges in the application the instruction areas that acquire instruction for calling the functions to any one of the plurality of the servers corresponding to the arrangement data, and further, arranges the instruction areas in which a plurality of the functions that are similar and that require authentication by the authentication-executing unit and/or a plurality of the functions that are to be authenticated in the same server are organized as a folder;
   an authentication-executing unit that, in the case where one of the functions of the plurality of servers corresponding to the instruction area arranged by the integrated-arrangement unit requires authentication, performs authentication with a server, of the plurality of servers, corresponding to the function requiring authentication, or, in the case where there is an instruction to select the folder in which a plurality of the functions is grouped and requires authentication, performs authentication with a server, of the plurality of servers, corresponding to the plurality of the grouped functions requiring authentication; and
   an authentication-state-changing unit that controls the authentication state in correlation with any one of the folder organized by the integrated-arrangement unit, the application, and the function, wherein
   the authentication-executing unit refers to the function information and/or the arrangement data to determine whether or not an instruction for calling a function has been acquired with respect to the indicated area in a same folder, and
   when acquiring an instruction for calling the function for which the instruction for calling was received, the authentication-state-changing unit, for the function for which the instruction for calling was received, performs the same authentication process by the authentication information of the authentication state data for another function in the same folder which has already been called.

2. The information processing apparatus according to claim 1, wherein
   the integrated-arrangement unit
   does not organize the instruction areas of the functions that do not require authentication by the authentication-executing unit as a folder; and
   servers corresponding to called functions may differ for each of the instruction areas.

3. The information processing apparatus according to claim 1, wherein
   the authentication-state-changing unit judges whether or not termination of the application is instructed, and in the case where the termination is instructed, disconnects a session of connection with a plurality of the servers having a function callable from the application at the time of termination of the application execution, sets the function callable from the application back to the non-authenticated state, and sets the function callable from the application in the authentication state data.

4. An image forming apparatus comprising an information processing apparatus according to claim 1.

5. The information processing apparatus according to claim 1, wherein:
   the authentication status data
   is data indicating the authentication status corresponding to the function of the server,
   includes information of a state in which authentication is successful and calling the function of the server is possible and a state in which unauthenticated state or authentication failed state, and
   includes, when the authentication is successful, state information authentication information related to authentication by the user with respect to the function, connection time from the start of the session connection, and time until disconnection.

6. An information processing system comprising a plurality of servers, and an information processing apparatus capable of calling functions of the plurality of servers; wherein each of the plurality of servers comprises:
a function-information-transmitting unit that transmits function information regarding functions that require authentication to the information processing apparatus;
an authenticating unit that performs authentication of the function corresponding to the function information transmitted by the function-information transmitting unit; and
a function-process-executing unit that executes a process of the function authenticated by the authenticating unit; and
the information processing apparatus comprises:
a storage unit that stores the function information, arrangement data that includes information of instruction areas in an application corresponding to each of the functions of the plurality of servers, and authentication state data that indicates an authentication state;
a function-information-receiving unit that receives the function information transmitted from the plurality of servers;
an integrated-arrangement unit that arranges in the application the instruction areas that acquire instructions for calling the functions to any one of the plurality of the servers corresponding to the arrangement data, and further, arranges the instruction areas in which a plurality of the functions that are similar and that require authentication by the authentication-executing unit and/ or a plurality of the functions that are to be authenticated in the same server are organized as a folder; and
an authentication-executing unit that, in the case where one of the functions of the plurality of servers corresponding to the instruction area arranged by the integrated-arrangement unit requires authentication, performs authentication with a server, of the plurality of servers, corresponding to the function requiring authentication, or, in the case where there is an instruction to select the folder in which a plurality of the functions is grouped and requires authentication, performs authentication with a server, of the plurality of servers, corresponding to the plurality of the grouped functions requiring authentication; and
an authentication-state-changing unit that controls the authentication state in correlation with any one of the folder organized by the integrated-arrangement unit, the application, and the function, wherein
the authentication-executing unit refers to the function information and/or the arrangement data to determine whether or not an instruction for calling a function has been acquired with respect to the indicated area in a same folder, and, when acquiring an instruction for calling the function for which the instruction for calling was received, the authentication-state-changing unit, for the function for which the instruction for calling was received, performs the same authentication process by the authentication information of the authentication state data for another function in the same folder which has already been called.

7. An information processing method that is executed by an information processing apparatus capable of calling functions of a plurality of servers, and that causes the information processing apparatus to:

store function information that indicates a function requiring authentication provided by a server of the plurality of servers, arrangement data that includes information of instruction areas in an application corresponding to each of the functions of the plurality of servers, and authentication state data that indicates an authentication state arrange in the application instruction areas that acquire instructions for calling the functions to any one of the plurality of the servers corresponding to the arrangement data, and further, arrange the instruction areas in which a plurality of the functions that are similar and that require authentication and/or a plurality of the functions that are to be authenticated in the same server are organized as a folder;

in the case where one of the functions of the plurality of servers corresponding to the instruction area arranged by the integrated-arrangement unit requires authentication, perform authentication with a server, of the plurality of servers, corresponding to the function requiring authentication, or, in the case where there is an instruction to select the folder in which a plurality of the functions is grouped and requires authentication, perform authentication with a server, of the plurality of servers, corresponding to the plurality of the grouped functions requiring authentication;

control the authentication state in correlation with any one of the organized folder, the application, and the function; and refer to the function information and/or the arrangement data to determine whether or not an instruction for calling a function has been acquired with respect to the indicated area in a same folder, and, when acquiring an instruction for calling the function for which the instruction for calling was received, for the function for which the instruction for calling was received, perform the same authentication process by the authentication information of the authentication state data for another function in the same folder which has already been called.

* * * * *